United States Patent
Sobel et al.

(10) Patent No.: US 8,006,116 B1
(45) Date of Patent: Aug. 23, 2011

(54) SYSTEMS AND METHODS FOR STORING HEALTH INFORMATION WITH COMPUTING-SYSTEM BACKUPS

(75) Inventors: William E. Sobel, Jamul, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 745 days.

(21) Appl. No.: 12/058,943

(22) Filed: Mar. 31, 2008

(51) Int. Cl.
*G06F 11/00* (2006.01)

(52) U.S. Cl. .............. 714/1; 714/47.1; 714/15; 714/20; 714/21; 711/162

(58) Field of Classification Search .............. 714/21, 714/47.1
See application file for complete search history.

(56) References Cited

U.S. PATENT DOCUMENTS

| | | | | |
|---|---|---|---|---|
| 7,571,347 B2* | 8/2009 | Gross et al. | ...................... | 714/15 |
| 2005/0021733 A1* | 1/2005 | Clinton et al. | ................. | 709/224 |
| 2005/0114614 A1* | 5/2005 | Anderson et al. | ............. | 711/162 |
| 2006/0143530 A1* | 6/2006 | Largman et al. | ................ | 714/36 |
| 2006/0168473 A1* | 7/2006 | Sahoo et al. | ..................... | 714/15 |
| 2007/0006023 A1* | 1/2007 | Fujibayashi | ...................... | 714/7 |
| 2007/0136302 A1* | 6/2007 | Zuber | .............................. | 707/10 |
| 2007/0277012 A1* | 11/2007 | Hara et al. | ..................... | 711/162 |
| 2008/0133566 A1* | 6/2008 | Jooste | ........................... | 707/101 |
| 2009/0063185 A1* | 3/2009 | Chang et al. | ....................... | 705/2 |
| 2010/0077160 A1* | 3/2010 | Liu et al. | ........................ | 711/162 |

* cited by examiner

*Primary Examiner* — Scott T Baderman
*Assistant Examiner* — Chae Ko
(74) *Attorney, Agent, or Firm* — Advantedge Law Group

(57) ABSTRACT

A computer-implemented method for storing information that identifies the state of health of a computing system at the time a backup of the computing system is created may comprise: 1) identifying a backup of the computing system, 2) performing an evaluation of the computing system's health, and then 3) storing health information that identifies the state of health of the computing system when the backup was created as metadata to the backup. Similarly, a method for determining whether to restore a backup of a computing system based on health information may comprise: 1) identifying a backup of the computing system, 2) identifying health information stored as metadata to the backup that identifies the state of health of the computing system when the backup was created, and 3) determining, based on the health information, whether to restore the backup. Corresponding systems and computer-readable media are also disclosed.

16 Claims, 9 Drawing Sheets

User Interface 600

| Volume 602 | Date and Time 604 | Event Triggered? 606 | Health Scores 608 | |
|---|---|---|---|---|
| C: | 7/1/2007 1:00:05 AM | No: Regularly-Scheduled Backup | Overall: 89<br>-Performance: 93<br>-Stability: 85<br>-Security: 89 | Restore 610 |
| C: | 6/24/2007 9:22:25 AM | Yes: Service Pack 2, Build 2600 | Overall: 95<br>-Performance: 96<br>-Stability: 94<br>-Security: 95 | Restore 612 |
| C: | 5/19/2007 6:06:16 PM | Yes: Installation of TuneBlaster v. 4.3 | Overall: 96<br>-Performance: 97<br>-Stability: 95<br>-Security: 96 | Restore 614 |

*FIG. 6*

User Interface 700

Backup(s) 704

Volume: C

Date/Time: 6/24/2007, 9:22:25 AM

Event Triggered? Yes, Service Pack 2, Build 2600

Health Scores:  Overall: 95
 - Performance: 96
 - Stability: 94
 - Security: 95

Restore 718

Filters 702

Health Filter 706
Only Display Backups with Health Scores Greater Than [75]
☑ 712

Date Filter 708
Only Display Backups From Last [2] Month(s)
☑ 714

Event Filter 710
Only Display Event-Triggered Backups
☑ 716

*FIG. 7*

SYSTEMS AND METHODS FOR STORING HEALTH INFORMATION WITH COMPUTING-SYSTEM BACKUPS

BACKGROUND

Conventional methods for backing up data typically involve creating a backup or snapshot of one or more volumes of a computing system on a predetermined schedule, upon the occurrence of a specified event (such as installation of an operating-system service pack), or when requested by a user. For example, a conventional backup software program may automatically back up a volume of a computing system prior to installing an operating-system patch in order to ensure that a pre-patch restore point exists. This may allow a user to restore the computing system to an earlier state to fix any performance or stability issues caused by the operating-system patch.

Unfortunately, given the rate of change on modern-day computing systems, a user may be unable to remember or determine an event responsible for stability or performance problems experienced by the user. Because conventional backup and restore systems typically only allow users to identify and restore backups of a volume by date or by the event that triggered creation of the backup, a user may be forced to repeatedly restore different backups of a volume in an attempt to identify a stable version of a volume.

SUMMARY

As will be described in greater detail below, the instant disclosure generally relates to systems and methods for storing information that identifies the state of health of a computing system at the time a backup of the computing system is created. Systems and methods for determining whether to restore a backup of a computing system based on health information are also disclosed.

For example, a method for storing information that identifies the state of health of a computing system at the time a backup of the computing system is created may comprise: 1) identifying a backup of the computing system, 2) performing an evaluation of the computing system's health, and then 3) storing health information that identifies the state of health of the computing system as metadata to the backup.

Backups may be identified either by detecting a backup created by an additional program (such as a conventional computer program for creating backups) or by creating a backup of the computing system. The backup may represent a partial backup of the computing system, a full backup of the computing system (such as a snapshot or image), an incremental backup of the computing system, a differential backup of the computing system, or any other form of computing-system backup. In certain embodiments, the metadata may further identify a date when the backup was created, a time when the backup was created, and/or an event (such as installation of an application or operating-system service pack) that triggered creation of the backup.

The health of a system may be evaluated by evaluating the performance or stability of the system using various performance or stability metrics. Such metrics may measure: 1) the processor, memory, and network usage of the system, 2) the number of operating-system, application, service, or device-driver errors experienced by the system, 3) system uptime, 4) system reboots (such as the number of system reboots per day), or any other useful information. As will be discussed in greater detail below, the health of a system may be expressed using a health score. This health score may represent an overall health score for the computing system, a performance score for the computing system, and/or a stability score for the computing system.

As detailed above, systems and methods for determining whether to restore a backup of a computing system based on health information are also disclosed. For example, a method for determining whether to restore a backup of a computing system based on health information may comprise: 1) identifying a backup of the computing system, 2) identifying health information stored as metadata to the backup that identifies the state of health of the computing system when the backup was created, and then 3) determining, based on the health information, whether to restore the backup.

In one example, determining whether to restore the backup may involve: 1) providing a user interface for displaying the health information to a user, 2) displaying the health information using the user interface, and then 3) receiving, via the user interface, a request from the user to restore the backup. This user interface may also be used to display a health score for the computing system, a date when the backup was created, a time when the backup was created, and/or an event that triggered creation of the backup.

In certain embodiments, the method may comprise: 1) identifying a plurality of backups of the computing system, 2) identifying health information for each of the plurality of backups, 3) identifying, based on the health information for each of the plurality of backups, a preferred backup from within the plurality of backups, and then 4) restoring the preferred backup. The preferred backup may be identified by: 1) providing a user interface, 2) displaying, using the user interface, the health information for each of the plurality of backups, and then 3) receiving, via the user interface, a request from a user to restore the preferred backup.

Systems and computer-readable media corresponding to the above-described methods are also disclosed. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a block diagram of an exemplary user interface for displaying health information for a computing-system backup according to at least one embodiment.

FIG. 7 is a block diagram of an exemplary user interface for displaying health information for a computing-system backup according to an additional embodiment.

Figure 1:
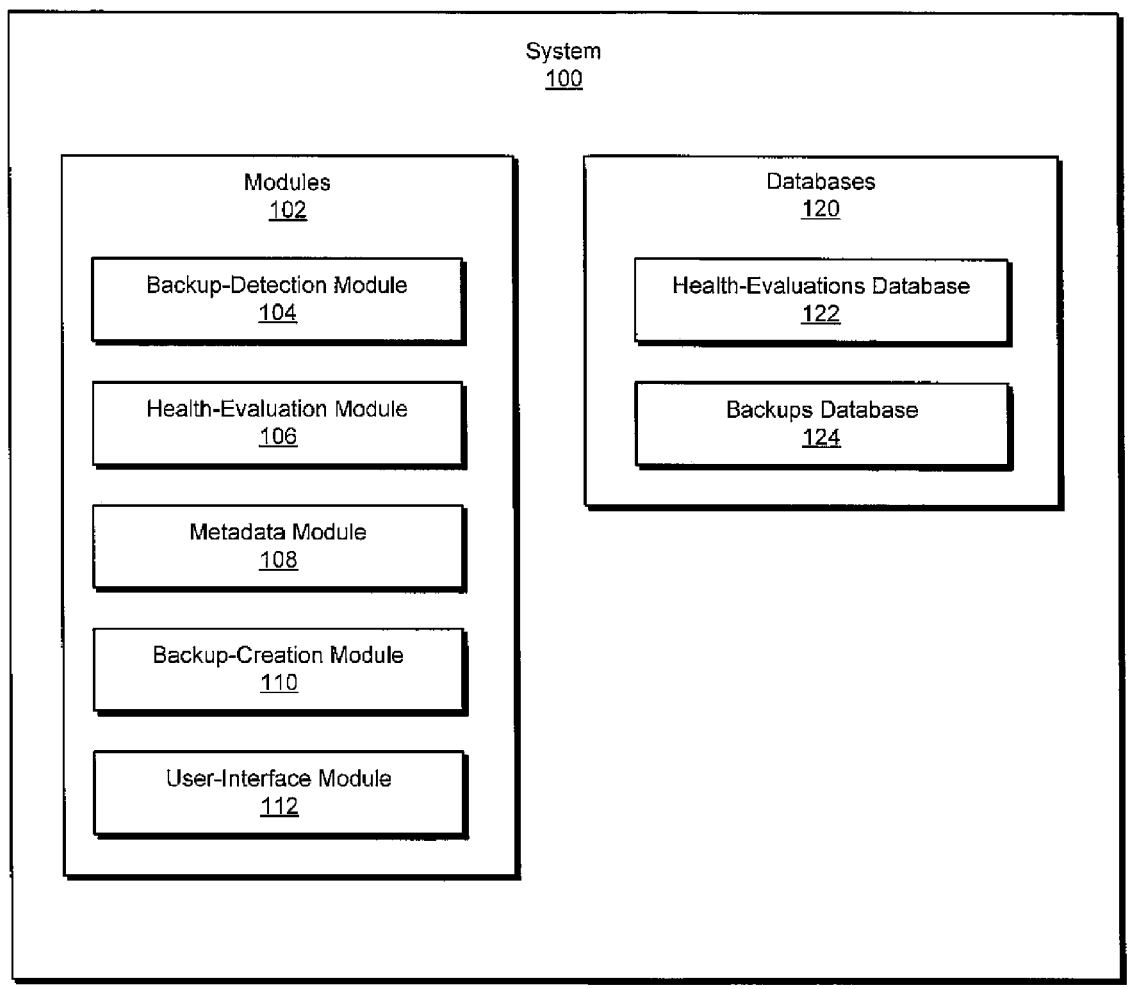
FIG. 1 is a block diagram of an exemplary system for storing health information with computing-system backups according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for storing information that identifies the state of health of a computing system at the time a backup of the computing system is created. Systems and methods for determining whether to restore a backup of a computing system based on health information are also disclosed.

The term "health," as used herein, generally refers to the overall wellness of a computing system. As detailed below, in certain embodiments the health of a computing system may be determined by evaluating the performance, stability, and/or state of security of the computing system.

The following will provide, with reference to FIG. 1, a detailed description of an exemplary system for: 1) storing information that identifies the state of health of a computing system at the time a backup of the computing system is created and 2) determining whether to restore a backup of a computing system based on health information. A description of an exemplary computing-system backup comprising health information stored as metadata will be provided in connection with FIG. 3. A description of the results of an exemplary health evaluation that may be performed will be provided in connection with FIG. 4. Descriptions of corresponding exemplary user interfaces for use with this system will be provided in connection with FIGS. 6 and 7. Detailed descriptions of corresponding exemplary computer-implemented methods will also be provided in connection with FIGS. 2 and 5.

FIG. 1 is a block diagram of an exemplary system 100 for storing health information with computing-system backups and/or restoring computing-system backups based on such health information. As illustrated in this figure, exemplary system 100 may comprise one or more modules for performing one or more tasks. For example, exemplary system 100 may comprise a backup-detection module 104 for detecting a backup of a computing system.

Exemplary system 100 may also comprise a health-evaluation module 106 for evaluating the health of a computing system (hereafter "health evaluations") and a metadata module 108 for creating and storing health information for a computing system as metadata to computing-system backups. In addition, system 100 may comprise a backup-creation module 110 for creating a computing-system backup containing information that identifies the state of health of a computing system at the time the backup is created. Exemplary system 100 may also comprise a user-interface module 112 for providing a user interface.

As illustrated in FIG. 1, exemplary system 100 may also comprise one or more databases 120. For example, exemplary system 100 may comprise a health-evaluations database 122 for storing the results of health-evaluations performed by health-evaluation module 106. Exemplary system 100 may also comprise a backups database 124 for storing backups for one or more computing systems. Although illustrated as separate devices, one or more of databases 120 in FIG. 1 may represent portions of a single database or a single computing device.

In certain embodiments, one or more of modules 102 may represent one or more software applications or programs that, when executed by a computing device, may cause the computing device to perform one or more tasks required to store health information with computing-system backups and/or to restore computing-system backups based on such health information. For example, as will be described in greater detail below, one or more of modules 102 may represent software modules configured to run on one or more computing devices, such as exemplary computing system 810 in FIG. 8 and/or portions of exemplary network architecture 900 in FIG. 9. One or more of modules 102 may also represent all or portions of one or more special-purpose computers configured to perform one or more tasks required to store health information with computing-system backups and/or to restore computing-system backups based on such health information.

In addition, one or more of databases 120 in FIG. 1 may represent a portion of one or more computing devices. For example, one or more of databases 120 may represent a portion of exemplary computing system 810 in FIG. 8 and/or portions of exemplary network architecture 900 in FIG. 9. Alternatively, one or more of databases 120 may represent one or more physically separate devices capable of being accessed by a computing device, such as exemplary computing system 810 in FIG. 8 and/or portions of exemplary network architecture 900 in FIG. 9.

Figure 2:
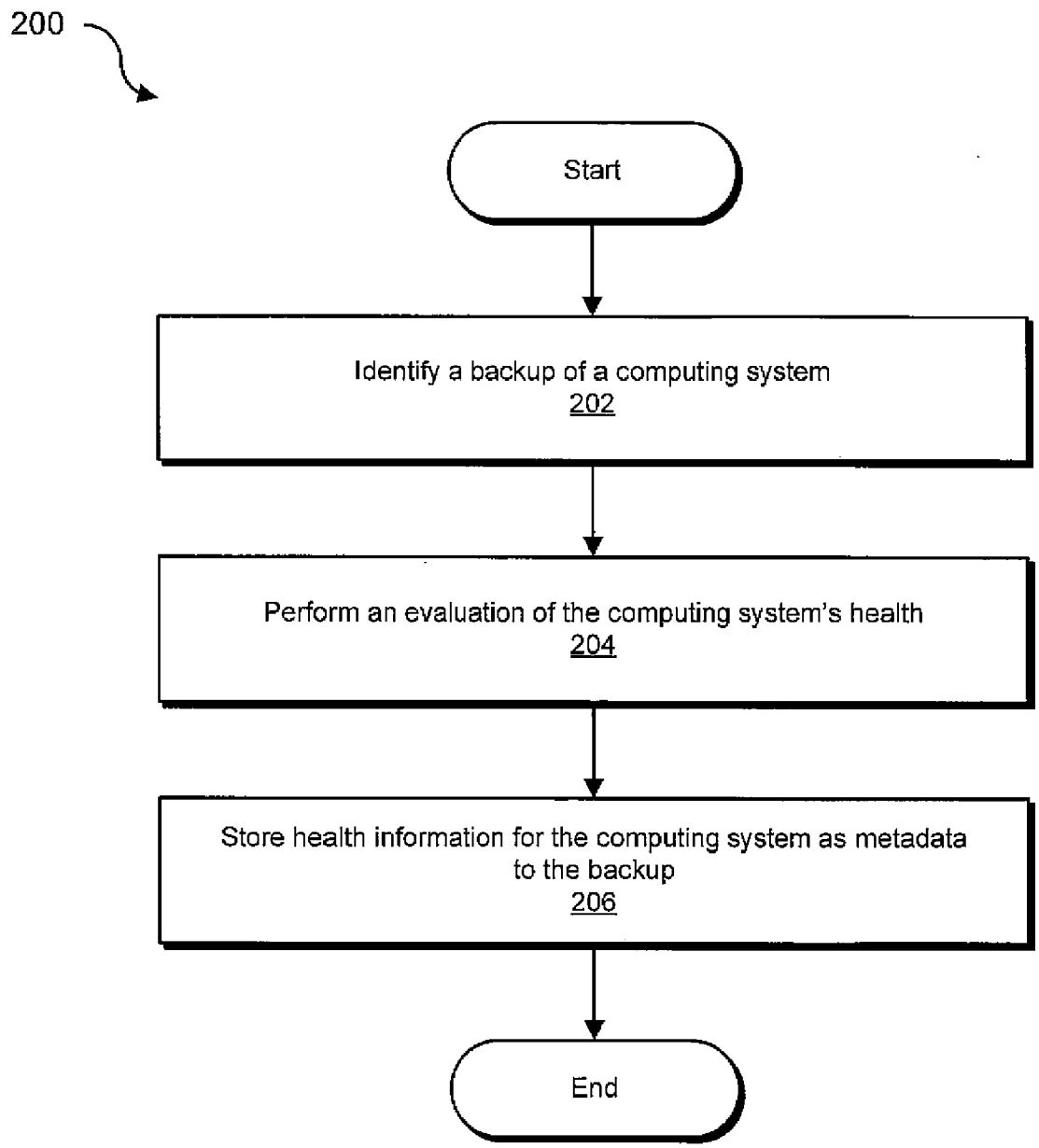
FIG. 2 is a flow diagram of an exemplary computer-implemented method for storing health information with computing-system backups according to at least one embodiment.

FIG. 2 is a flow diagram of an exemplary computer-implemented method 200 for storing information that identifies the state of health of a computing system at the time a backup of the computing system is created. As illustrated in this figure, at step 202 a backup of a computing system may be identified. For example, backup-detection module 104 in FIG. 1 may detect a backup 300 in FIG. 3. In certain embodiments, backup 300 may contain backup data 304 that may represent a backup of all or a portion of exemplary computing system 810 in FIG. 8.

Backups of computing system may be identified in a variety of ways. For example, backup-detection module 104 in FIG. 1 may detect a backup for computing system 810 in FIG. 8 when it is created by an additional module or software program, such as a conventional backup program. In an additional embodiment, identifying a backup of a computing system in step 202 may comprise creating a backup of a computing system. For example, backup-creation module 110 in FIG. 1 may create a backup of computing system 810 in FIG. 8. The term "backup," as used herein, may refer to any type or form of backup of at least a portion of a file, a program, or an entire computer system. Examples of backups include, without limitation, partial backups, full backups (such as snapshots or images), incremental backups, differential backups, or any other suitable mechanism for backing up data.

At step 204, the current state of health of the computing system may be determined by performing a health evaluation of the computing system. The phrase "health evaluation," as used herein, generally refers to any type or form of evaluation used to determine the health of a computing system. Examples of health evaluations include, without limitation, performance evaluations of a computing system (which may measure the performance of various aspects of the computing system, such as memory usage, CPU usage, and page faults), stability evaluations of a computing system (which may measure the stability of a computing system by determining, for example, the number of errors encountered by an operating system or an application installed on the computing system), and security evaluations (which may measure the state of security of a computing system by determining, for example, the number of security vulnerabilities experienced by the computing system).

Step 204 in FIG. 2 may be performed in a variety of ways. For example, health-evaluation module 106 in FIG. 1 may, after backup-detection module 104 identifies a backup in step 202, perform an evaluation of the health of exemplary computing system 810 in FIG. 8 by analyzing the overall stability and performance of computing system 810. An illustration of the results of such a health evaluation is provided in FIG. 4. As illustrated in this figure, system-health evaluation 400 may comprise a stability index 402 and a performance index 412. In certain embodiments, stability index 402 may comprise a plurality of stability metrics 404 and results 406 for each of these metrics.

Stability metrics 404 generally represent any type or form of metric that may be used to measure the stability of a system. Examples of values that stability metrics may measure include, without limitation, operating-system errors (such as blue-screen errors), application errors (such as application hangs or freezes), service errors, device-driver errors, system uptime, and system reboots (such as the number of system reboots per day). In the example provided in FIG. 4, stability index 402 details the average number of blue-screen errors identified by health-evaluation module 106 during the evaluation period (in this case, zero), the average number of service errors identified by health-evaluation module 106 (one), and the average number of application errors identified by health-evaluation module 106 (one).

As with stability index 402, performance index 412 may comprise a plurality of performance metrics 414 and results 416 for each of these metrics. Performance metrics 414 generally represent any type or form of metric that may be used to measure the performance of a computing system. Examples of values that performance metrics may measure include, without limitation, CPU usage, page faults, network usage (such as the number of IP datagrams), and memory usage. In the example provided in FIG. 4, performance index 412 details the computing system's maximum and average CPU usage during the evaluation period (in this case 7 and 2.1875, respectively), the maximum and average number of page faults experienced by the system during the evaluation period (844 and 248.4375, respectively), and the maximum and average number of IP datagrams sent and received by the system during the evaluation period (8 and 3.25, respectively).

Figure 4:
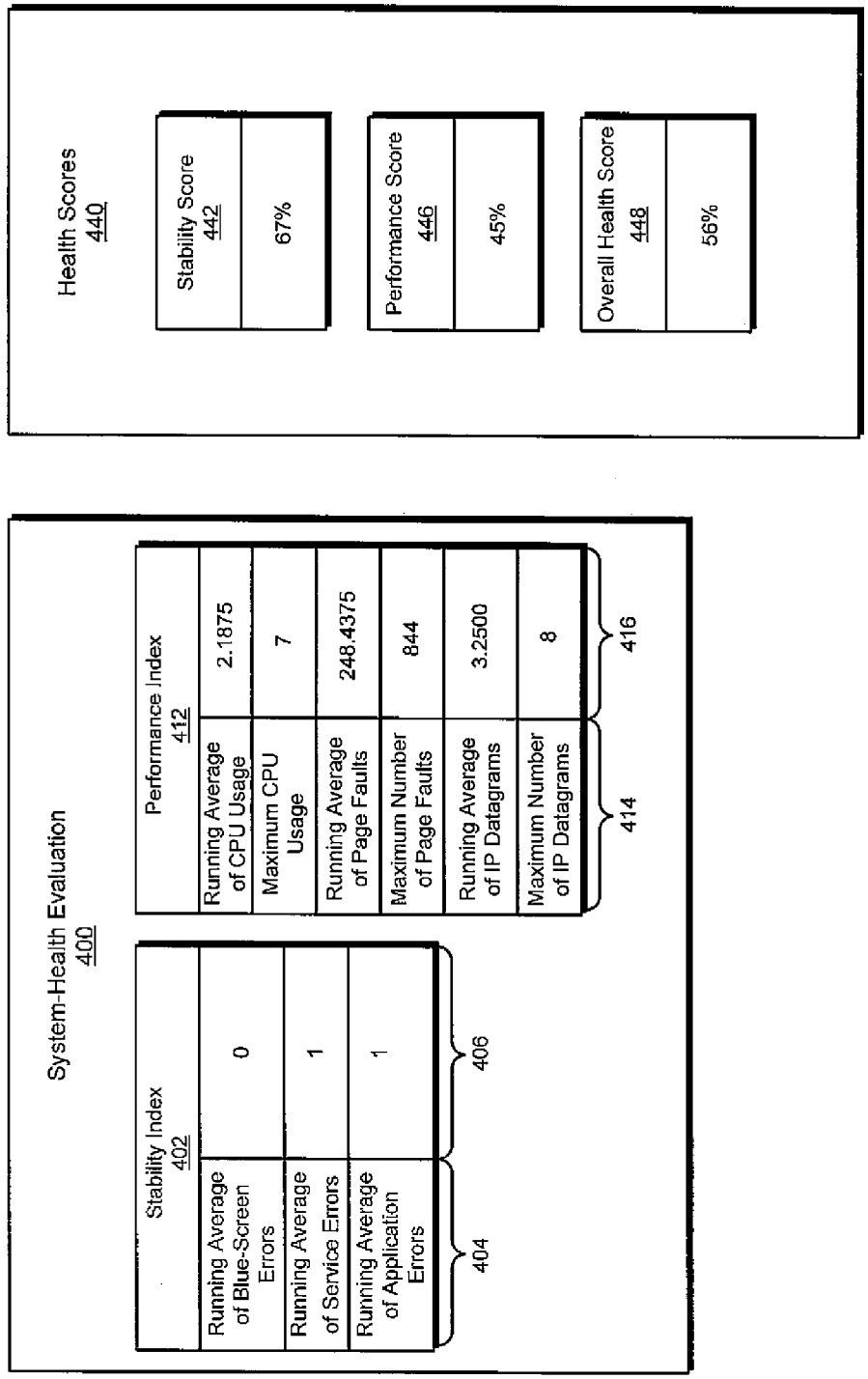
FIG. 4 is a block diagram illustrating the results of an exemplary health evaluation that may be performed according to at least one embodiment.

As illustrated in FIG. 4, the results 406 and 416 of stability metrics 404 and performance metrics 414 may be represented using running averages, maximum or peak values, incremental count values, or any other suitable method. Health evaluations may be performed periodically (such as every 24 hours), continuously, or may be event-triggered. For example, the health evaluation detailed in step 204 may be performed when a backup is detected or created or immediately thereafter. Alternatively, this health evaluation may represent the results of a periodic or continuous health evaluation of the computing system.

The health of a computing system may be expressed or quantified in a variety of ways. In certain embodiments, one or more health scores, such as health scores 440 in FIG. 4, may be calculated based on the results of system-health evaluation 400. As illustrated in FIG. 4, health scores 440 may represent the overall stability of the computing system (as represented by stability score 442) and/or the overall performance of the computing system (as represented by performance score 446). For example, stability score 442 may represent, in percentage form, how stable a computing system is relative to some maximum stability index. In the example illustrated in FIG. 4, the stability score for the computing system is 67%, which may mean that the computing system is roughly 33% less stable than might be desired or considered ideal. Similarly, performance score 446 may represent, in percentage form, how well a computing system is performing relative to some maximum stability index. In the example illustrated in FIG. 4, the performance score for the computing system is 45%, which may mean that the performance of the computing system is roughly 55% less than might be desired or considered ideal.

In at least one embodiment, an overall health score may be calculated for the computing system by averaging stability score 442 with performance score 446. In the example illustrated in FIG. 4, the overall health score for the computing system is 56%, which may mean that the overall health of the computing system is roughly 44% less than might be desired or considered ideal. As detailed above, the health of a computing system may be expressed or quantified in a variety of ways. As such, while the health evaluations and results illustrated in FIG. 4 have been described with a certain degree of particularity, the health of a computing system may be calculated or expressed using any number of additional heuristics, formulas, or methods.

Returning to FIG. 2, at step 206 health information for the computing system may be stored as metadata to the backup identified in step 202. For example, metadata module 108 in FIG. 1 may store health information 306 as metadata 302 to backup 300 in FIG. 3, which may represent a backup of computing system 810 in FIG. 8. In at least one embodiment, health information 306 may identify the state of health of the computing system when backup 300 in FIG. 3 was created.

In certain embodiments, health information 306 may contain the results of a system-health evaluation, such as system-health evaluation 400 in FIG. 4. Additionally or alternatively, health information 306 may contain one or more health scores for a computing system, such as health scores 440 in FIG. 4.

Figure 3:
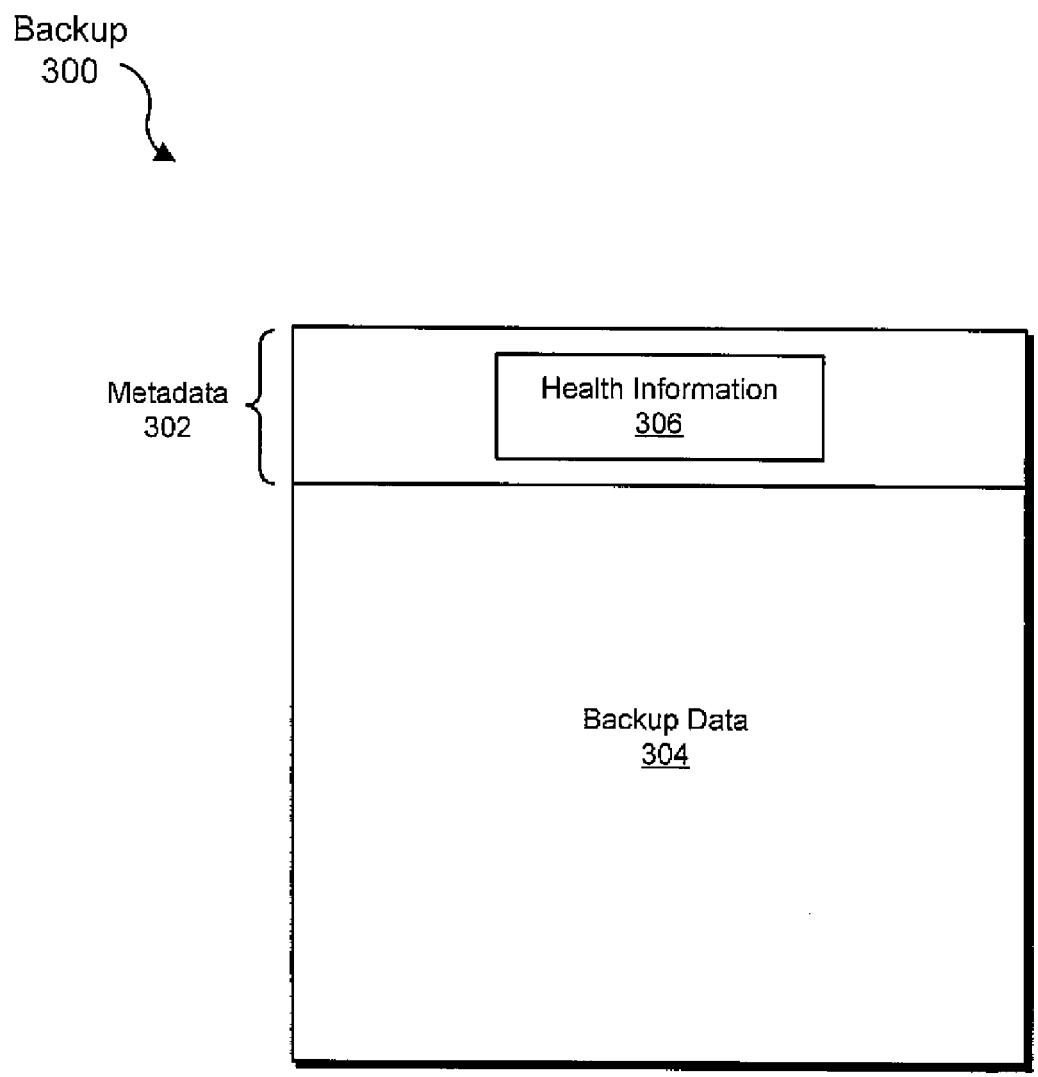
FIG. 3 is a block diagram of an exemplary computing-system backup comprising health information stored as metadata according to at least one embodiment.

Metadata 302 in FIG. 3 generally represents any type or form of data that describes additional data. In certain embodiments, metadata 302 may contain data that describes one or more characteristics of backup 300. Metadata 302 may also, in addition to comprising health information 306, identify one or more characteristics of backup 300. For example, metadata 302 may identify a date when backup 300 was created, a time when backup 300 was created, and/or an event that triggered the creation of backup 300. In certain embodiments, metadata 302 may be stored with and represent a portion of backup 300. In additional embodiments, metadata 302 may represent a separate or distinct file from backup 300. Upon completion of step 206 in FIG. 2, exemplary method 200 in FIG. 2 may terminate.

Figure 5:
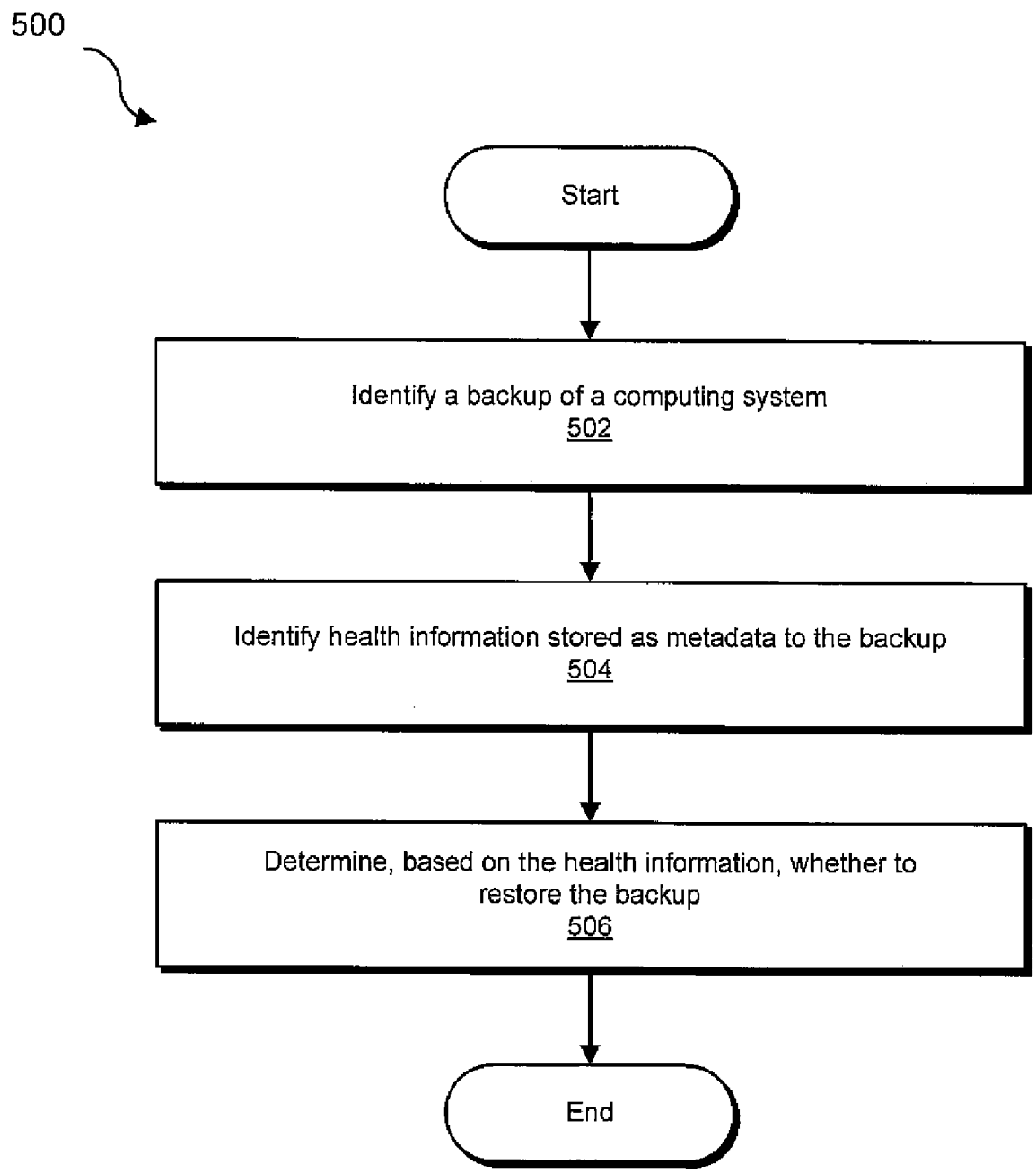
FIG. 5 is a flow diagram of an exemplary computer-implemented method for determining whether to restore a backup of a computing system based on health information in accordance with at least one embodiment.

As will be described in greater detail below, health information 306 in FIG. 3 may enable a user to identify a backup of a computing system to be restored based on health information. FIG. 5 is an illustration of a computer-implemented method 500 for determining whether to restore a backup of a computing system based on health information. As illustrated in this figure, at step 502 a backup of a computing system may be identified. For example, backup-detection module 104 in FIG. 1 may identify a backup 300 in FIG. 3 of computing system 810 in FIG. 8.

At step 504, health information stored as metadata to the backup may be identified. For example, backup-detection module 104 and/or metadata module 108 in FIG. 1 may identify health information 306 stored as metadata 302 to backup 300 in FIG. 3. As detailed above, in at least one embodiment health information 306 may identify the state of health of the computing system when backup 300 was created. In addition, as explained above, metadata 302 may either be stored with and represent a portion of backup 300 or may represent a separate or distinct file from backup 300.

At step 506, the system or a user may determine, based on the health information identified in step 504, whether to restore the backup. Step 506 may be performed in a variety of ways. In one embodiment, determining whether to restore the backup may comprise displaying, using a user interface, the health information identified in step 504 to a user and then receiving, via the user interface, a request from the user to restore the backup.

FIG. 6 is an illustration of an exemplary user interface 600 that may be used to display health information for one or more computing-system backups. As illustrated in this figure, user interface 600 may display a volume 602 backed up by a computing-system backup, the date and/or time 604 when a backup was created, an event 606 that may have triggered creation of a backup, and/or one or more health scores 608 for a backup.

In the example illustrated in FIG. 6, user interface 600 may display health information for a first backup of Volume C created at 6:06:16 p.m. on May 19, 2007, a second backup of Volume C created at 9:22:25 a.m. on Jun. 24, 2007, and a third backup of Volume C created at 1:00:05 a.m. on Jul. 1, 2007. In this example, user interface 600 may indicate that the first backup created on May 19, 2007 was created in response to installation of the program TuneBlaster v.4.3. Similarly, user interface 600 may indicate that the second backup of Volume C created on Jun. 24, 2007 was created in response to installation of Service Pack 2, Build 2600, while the third backup of Volume C created on Jul. 1, 2007 represents a regularly-scheduled backup.

User interface 600 may also display one or more health scores 608 for each backup of Volume C. For example, user interface 600 may display an overall health score, a performance health score, a stability health score, and/or a security health score for each of the backups of Volume C. In this example, a user may identify a preferred backup from within the plurality of backups of Volume C based on the information displayed by user interface 600. For example, a user may decide to restore the backup of Volume C created on May 19, 2007 since the overall health score for this backup (96) is higher than the overall health scores for the backups created on Jun. 24, 2007 and Jul. 1, 2007, respectively. In this example, the user may restore the backup created on May 19, 2007 by selecting user-selectable object 614.

User interface 600 generally represents any type or form of locally-executed or web-based user interface. In addition, while user interface 600 has been described with a certain degree of particularity, various other user interfaces may be provided to display health information for computing-system backups to a user. For example, FIG. 7 is an illustration of an exemplary user interface 700 for displaying health information for computing-system backups according to an additional embodiment. In this example, user interface 700 may enable a user to search, sort, or filter the health information to be displayed for one or more computing-system backups.

For example, user interface 700 may display one or more filters 702 that may allow a user to limit the results displayed within a backup display area 704. For example, a user may request that only backups having health scores exceeding a certain number (such as 75) be displayed within display area 704 by checking user-selectable box 712. Similarly, a user may request that only backups created within a certain date range (such as the last two months) be displayed within display area 704 by checking user-selectable box 714. A user may also request that only backups created in response to an event (such as installation of a service pack or application) be displayed within display area 704 by checking user-selectable box 716. A user may then request that a backup displayed within display area 704 be restored by selecting user-selectable object 718.

As detailed above, user interface 700 may enable a user to search, sort, or filter the health information to be displayed for one or more computing-system backups. For example, a user may, by interacting with user interface 700 (and/or variations of user interface 700), request that: 1) only the most stable backup of a computing system be displayed, 2) only the newest backup of a computing system within an acceptable health range be displayed, and/or 3) only the three most-stable backups created within the past month be displayed.

As detailed above, any type or form of user interface may be used to display health information for computing-system backups to a user. As such, while user interfaces 600 and 700 have been described with a certain degree of particularity, numerous variations may be made thereto. For example, in certain embodiments providing a user interface may comprise displaying health information for a backup in a conventional user interface for a backup or restore program. For example, one or more health scores (such as health scores 440 in FIG. 4) may be displayed as an additional axis on a calendar or time-based graph displayed in a user interface for a conventional backup or restore program.

As detailed above, step 506 in FIG. 5 may be performed in a variety of ways. In one embodiment, determining whether to restore the backup may comprise automatically identifying a backup (from within a plurality of a backups of a volume of a computing system) to be restored based on health information. For example, backup-detection module 104 in FIG. 1 may automatically identify, from within the plurality of backups of Volume C in FIG. 6, the backup of Volume C created on May 19, 2007 since the overall health score for this backup (96) is higher than the overall health scores for the backups created on Jun. 24, 2007 and Jul. 1, 2007, respectively. Exemplary system 100 in FIG. 1 may then automatically restore this backup in order to return the computing system to its healthiest state. Upon completion of step 506 in FIG. 5, exemplary method 500 may terminate.

As detailed above, the methods and systems disclosed herein may enable a user (or a system) to restore a computing system to its healthiest state based on health information. In at least one embodiment, this may prevent a user from having to repeatedly restore different backups of a volume in an attempt to identify a stable version of a volume.

Figure 8:
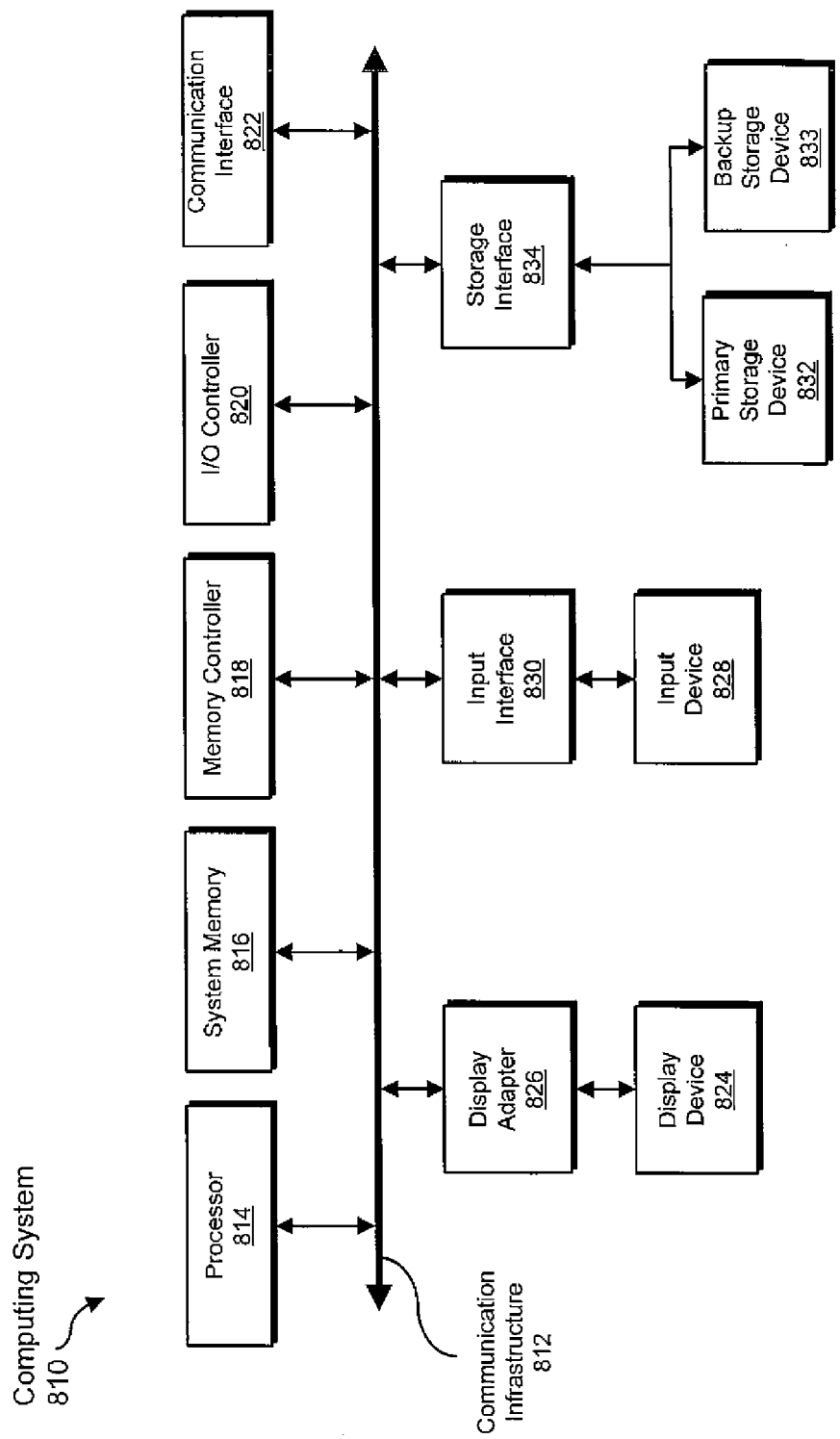
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may comprise at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the identifying, performing, storing, creating, evaluating, calculating, determining, providing, displaying, receiving, and restoring steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may comprise both a volatile memory unit (such as, for example, system memory 816) and a non-volatile storage device (such as, for example, primary storage device 832, as described in detail below).

In certain embodiments, exemplary computing system 810 may also comprise one or more components or elements in addition to processor 814 and system memory 816. For example, as illustrated in FIG. 8, computing system 810 may comprise a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as identifying, performing, storing, creating, evaluating, calculating, determining, providing, displaying, receiving, and restoring.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for identifying, performing, storing, creating, evaluating, calculating, determining, providing, displaying, receiving, and restoring steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network comprising additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and TATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the identifying, performing, storing, creating, evaluating, calculating, determining, providing, displaying, receiving, and restoring steps disclosed herein. Communication interface 822 may also be used to perform and/or be a means for performing other steps and features set forth in the instant disclosure.

As illustrated in FIG. 8, computing system 810 may also comprise at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also comprise at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the identifying, performing, storing, creating, evaluating, calculating, determining, providing, displaying, receiving, and restoring steps disclosed herein. Input device 828 may also be used to perform and/or be a means for performing other steps and features set forth in the instant disclosure.

As illustrated in FIG. 8, exemplary computing system 810 may also comprise a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 810.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also comprise other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, the exemplary file systems disclosed herein may be stored on primary storage device 832, while the exemplary file-system backups disclosed herein may be stored on backup storage device 833. Storage devices 832 and 833 may also be used, for example, to perform and/or be a means for performing, either alone or in combination with other elements, one or more of the identifying, performing, storing, creating, evaluating, calculating, determining, providing, displaying, receiving, and restoring steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
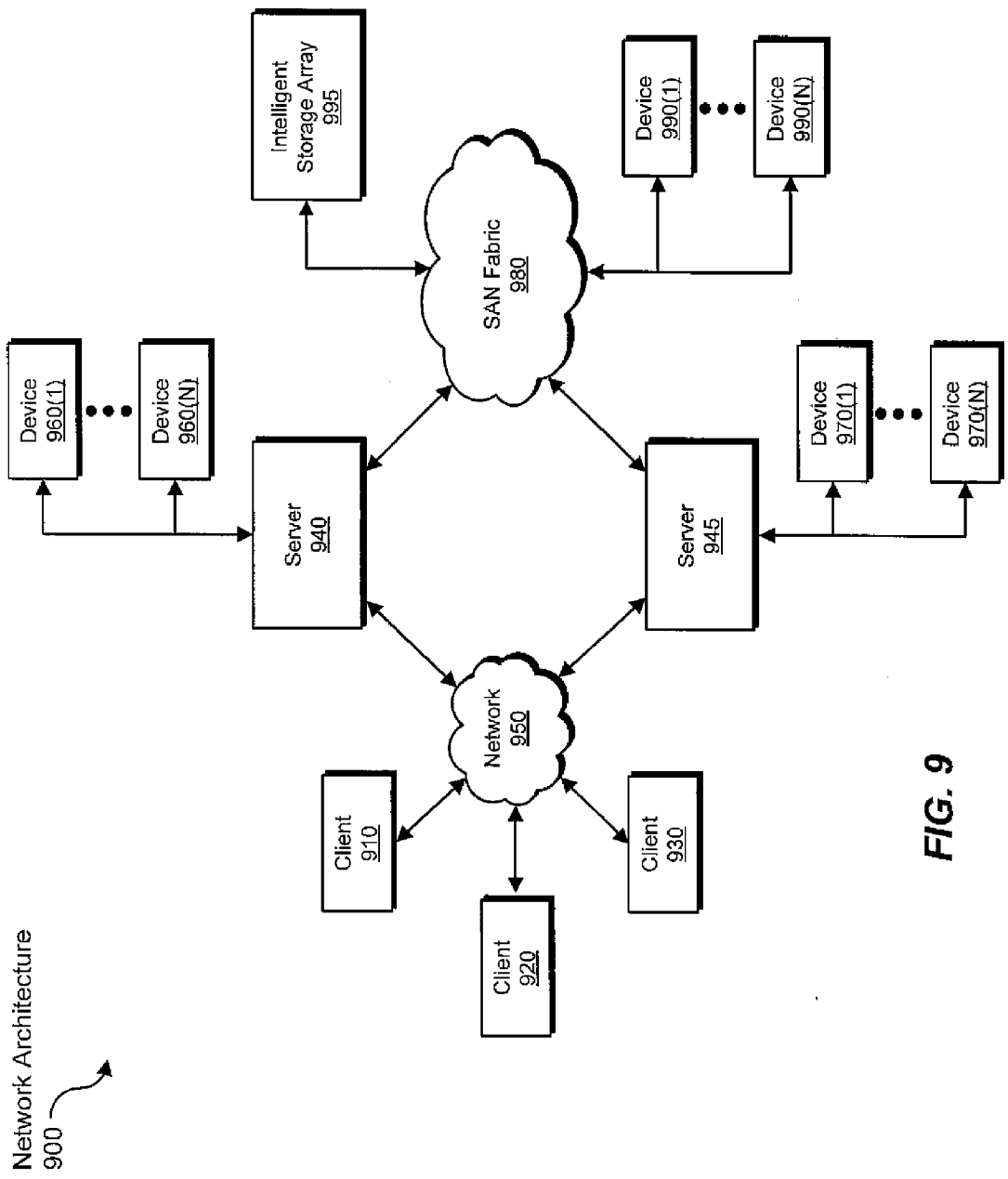
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8. Similarly, servers 940 and 945 generally represent computing devices or systems, such as application servers or database servers, configured to provide various database services and/or to run certain software applications. Network 950 generally represents any telecommunication or computer network; including, for example, an intranet, a wide area network (WAN), a local area network (LAN), a personal area network (PAN), or the Internet.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the identifying, performing, storing, creating, evaluating, calculating, determining, providing, displaying, receiving, and restoring steps disclosed herein. Network architecture 900 may also be used to perform and/or be a means for performing other steps and features set forth in the instant disclosure.

As detailed above, computing system 810 and/or one or more of the components of network architecture 900 may perform and/or be a means for performing, either alone or in combination with other elements, one or more steps of the exemplary methods described and/or illustrated herein. For example, a computer-implemented method for storing information that identifies the state of health of a computing system at the time a backup of the computing system is created may comprise: 1) identifying a backup of the computing system, 2) performing an evaluation of the computing system's health, and then 3) storing health information that identifies the state of health of the computing system when the backup was created as metadata to the backup. The backup may represent a partial backup of the computing system, a full backup of the computing system, an incremental backup of the computing system, or a differential backup of the computing system.

In certain embodiments, the metadata may further identify a date when the backup was created, a time when the backup was created, and/or an event that triggered creation of the backup. In addition, performing the evaluation of the computing system's health may comprise creating a performance index based on at least one performance metric and/or a stability index based on at least one stability metric. The performance metric may measure processor usage, memory usage, network usage, and page faults, while the stability metric may measure operating-system errors, application errors, service errors, device-driver errors, system uptime, and system reboots.

In certain embodiments, identifying the backup may comprise creating the backup. In addition, performing the evaluation of the computing system's health may comprise periodically evaluating the health of the computing system, continuously evaluating the health of the computing system, or evaluating the health of the computing system upon identifying the backup. Performing the evaluation of the computing system's health may also comprise calculating a health score for the computing system. As detailed above, this health score may represent an overall health score for the computing system, a performance score for the computing system, and/or a stability score for the computing system.

In an additional embodiment, a computer-implemented method for determining whether to restore a backup of a computing system based on health information may comprise: 1) identifying a backup of the computing system, 2) identifying health information stored as metadata to the backup that identifies the state of health of the computing system when the backup was created, and then 3) determining, based on the health information, whether to restore the backup.

Determining whether to restore the backup may comprise providing a user interface for displaying the health information to a user, displaying the health information using the user interface, and then receiving, via the user interface, a request from the user to restore the backup. In addition, displaying the health information may comprise displaying a health score for the computing system, displaying a date when the backup was created, displaying a time when the backup was created, and/or displaying an event that triggered creation of the backup.

In certain embodiments, the method may comprise identifying a plurality of backups of the computing system, identifying health information for each of the plurality of backups, identifying, based on the health information for each of the plurality of backups, a preferred backup from within the plurality of backups, and then restoring the preferred backup. The preferred backup may be identified by providing a user interface, displaying, using the user interface, the health information for each of the plurality of backups, and then receiving, via the user interface, a request from a user to restore the preferred backup.

In additional embodiments, computing system 810 and/or one or more of the components of network architecture 900 may represent a means for creating, either alone or in combination with other elements, a backup of a computing system that comprises backup data and metadata comprising health information that identifies the state of health of the computing system when the backup was created.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for storing information that identifies the state of health of a computing system at the time a backup of the computing system is created, at least a portion of the method being performed by at least one processor of the computing system, the method comprising:
    identifying a backup of the computing system;
    in response to identifying the backup of the computing system, performing an evaluation of the state of health of the computing system at the time the backup was created;
    creating health information that identifies the state of health of the computing system at the time the backup was created;
    storing the health information as metadata to the backup to enable a user to identify the state of health of the computing system at the time the backup was created.

2. The method of claim 1, wherein the metadata further identifies at least one of:
    a date when the backup was created;
    a time when the backup was created;
    an event that triggered creation of the backup.

3. The method of claim 1, wherein performing the evaluation of the state of health of the computing system comprises creating at least one of:
    a performance index based on at least one performance metric;
    a stability index based on at least one stability metric.

4. The method of claim 3, wherein:
    the performance metric measures at least one of:
        processor usage;
        memory usage;
        network usage;
        page faults;
    the stability metric measures at least one of:
        operating-system errors;
        application errors;
        service errors;
        device-driver errors;
        system uptime;
        system reboots.

5. The method of claim 1, wherein identifying the backup comprises creating the backup.

6. The method of claim 1, wherein performing the evaluation of the state of health of the computing system comprises at least one of:
    periodically evaluating the health of the computing system;
    continuously evaluating the health of the computing system;
    evaluating the health of the computing system upon identifying the backup.

7. The method of claim 1, wherein performing the evaluation of the state of health of the computing system comprises calculating a health score for the computing system.

8. The method of claim 1, wherein the health information comprises a health score for the computing system, the health score comprising at least one of:
    an overall health score for the computing system;
    a performance score for the computing system;
    a stability score for the computing system.

9. The method of claim 1, wherein the backup comprises at least one of:
    a partial backup of the computing system;
    a full backup of the computing system;
    an incremental backup of the computing system;
    a differential backup of the computing system.

10. A computer-implemented method for determining whether to restore a backup of a computing system based on health information, at least a portion of the method being performed by at least one processor of the computing system, the method comprising:
    identifying a backup of the computing system;
    identifying health information stored as metadata to the backup, the health information identifying the state of health of the computing system at the time the backup was created;
    determining, based on the health information, whether to restore the backup.

11. The method of claim 10, wherein determining whether to restore the backup comprises:
    providing a user interface for displaying the health information to a user;
    displaying the health information using the user interface;
    receiving, via the user interface, a request from the user to restore the backup.

12. The method of claim 11, wherein displaying the health information comprises displaying a health score for the computing system, the health score comprising at least one of:
    an overall health score for the computing system;
    a performance score for the computing system;
    a stability score for the computing system.

13. The method of claim 11, wherein displaying the health information comprises displaying at least one of:
    a date when the backup was created;
    a time when the backup was created;
    an event that triggered creation of the backup.

14. The method of claim 10, further comprising restoring the backup.

15. The method of claim 10, wherein:
    identifying the backup comprises identifying a plurality of backups of the computing system;
    identifying the health information comprises identifying health information for each of the plurality of backups;
    wherein the health information for each backup identifies the state of health of the computing system at the time the backup was created;

determining whether to restore the backup comprises:
  identifying, based on the health information for each of the plurality of backups, a preferred backup from within the plurality of backups;
  restoring the preferred backup.

16. The method of claim 15, wherein identifying the preferred backup comprises:
  providing a user interface;
  displaying, using the user interface, the health information for each of the plurality of backups;
  receiving, via the user interface, a request from a user to restore the preferred backup.

* * * * *